US012594206B2

(12) United States Patent
Backman

(10) Patent No.: US 12,594,206 B2
(45) Date of Patent: Apr. 7, 2026

(54) PATIENT HANDLING APPARATUS

(71) Applicant: Arjo IP Holding Aktiebolag, Malmö (SE)

(72) Inventor: Jon Andreas Backman, Malmö (SE)

(73) Assignee: Arjo IP Holding Aktiebolag, Malmö (SE)

( * ) Notice: Subject to any disclaimer, the term of this patent is extended or adjusted under 35 U.S.C. 154(b) by 428 days.

(21) Appl. No.: 18/014,491

(22) PCT Filed: Jun. 17, 2021

(86) PCT No.: PCT/EP2021/066413
§ 371 (c)(1),
(2) Date: Jan. 5, 2023

(87) PCT Pub. No.: WO2022/008194
PCT Pub. Date: Jan. 13, 2022

(65) Prior Publication Data
US 2023/0310242 A1 Oct. 5, 2023

(30) Foreign Application Priority Data

Jul. 6, 2020 (SE) ................................... 2050850-3

(51) Int. Cl.
*A61G 7/10* (2006.01)
*G01G 19/44* (2006.01)
(Continued)

(52) U.S. Cl.
CPC ........... *A61G 7/108* (2013.01); *A61G 7/1019* (2013.01); *A61G 7/1046* (2013.01); *G01G 19/44* (2013.01);
(Continued)

(58) Field of Classification Search
CPC ........ G01G 19/14; G01G 19/18; G01G 19/44; G01G 23/01; G01G 23/18; A61G 2203/44;
(Continued)

(56) References Cited

U.S. PATENT DOCUMENTS 4,420,052 A * 12/1983 Hale ...................... G01G 19/52
177/132
4,482,783 A * 11/1984 Laimins ................. G01G 19/14
177/211
(Continued)

FOREIGN PATENT DOCUMENTS

DE 102011080691 A1 * 2/2013 ........... A61B 6/0407
DE 102012201783 A1 * 8/2013 ........... A61B 6/0487
(Continued)

OTHER PUBLICATIONS

International Search Report and Written Opinion dated Nov. 26, 2021, issued in corresponding International Patent Application No. PCT/EP2021/066413.
(Continued)

*Primary Examiner* — Natalie Huls
(74) *Attorney, Agent, or Firm* — Morgan, Lewis & Bockius LLP

(57) ABSTRACT

A patient handling apparatus (10) comprising a base (30) with a frame (31) and a patient support device (20). The patient handling apparatus (10) further comprises a weighing arrangement (90) for weighing a patient supported by the patient support device (20), said weighing arrangement (90) comprising a sub frame (91) and a plurality of load sensors (95, 96, 97). The sub frame (91) is arranged on the load sensors (95, 96, 97), said load sensors (95, 96, 97) defining a weighing area (S), whereby the patient support device (20) is mounted to the frame (31) such that a central point (C) of a seat support portion (21) of the patient support device (20)
(Continued)

is positioned outside the weighting area (S) in at least one position of the patient support device (20).

37 Claims, 7 Drawing Sheets

(51) Int. Cl.
*G01G 23/01* (2006.01)
*G01G 23/18* (2006.01)

(52) U.S. Cl.
CPC ............. *G01G 23/01* (2013.01); *G01G 23/18* (2013.01); *A61G 2203/44* (2013.01)

(58) Field of Classification Search
CPC .. A61G 7/1019; A61G 7/1051; A61G 7/1059; A61G 7/108; A61G 7/1046
See application file for complete search history.

(56) References Cited

U.S. PATENT DOCUMENTS

| | | | | |
|---|---|---|---|---|
| 4,487,276 | A | * | 12/1984 | Swersey ................ G01G 21/23 |
| | | | | 177/1 |
| 4,926,951 | A | | 5/1990 | Carruth et al. |
| 5,269,388 | A | | 12/1993 | Reichow et al. |
| 5,279,010 | A | | 1/1994 | Ferrand et al. |
| 5,319,817 | A | * | 6/1994 | Hay .................... A61G 7/1057 |
| | | | | 177/144 |
| 5,859,390 | A | | 1/1999 | Stafford et al. |
| 5,892,180 | A | | 4/1999 | Carey |
| 6,610,935 | B1 | | 8/2003 | Siegel |
| 2002/0153176 | A1 | * | 10/2002 | Downing ............... G01G 19/44 |
| | | | | 177/144 |
| 2007/0157385 | A1 | | 7/2007 | Lemire et al. |
| 2009/0252300 | A1 | * | 10/2009 | Schwartz ............... A61B 5/055 |
| | | | | 378/209 |
| 2013/0319775 | A1 | | 12/2013 | Ngoh et al. |
| 2018/0235822 | A1 | | 8/2018 | Wako et al. |
| 2018/0340856 | A1 | | 11/2018 | Wang et al. |

FOREIGN PATENT DOCUMENTS

| | | | |
|---|---|---|---|
| GB | 2127981 | A | 4/1984 |
| JP | S59-131352 | A | 7/1984 |
| WO | 94/06390 | A1 | 3/1994 |
| WO | 03/079953 | A2 | 10/2003 |

OTHER PUBLICATIONS

Notice of Opposition issued on Jul. 8, 2025 in European Patent Application No. 21733966.2.

Low Profile Platform Load Cell, Model 60060, Sensortronics, Vishay Precision Group, Jun. 5, 2012.

"Advance Series Bed from Hill-Rom", Service Manual, Hill-Rom, Inc. (1998).

* cited by examiner

PATIENT HANDLING APPARATUS

TECHNOLOGY FIELD

The present invention relates to a patient handling apparatus. In particular, the present invention relates to a patient handling apparatus with weighing arrangement.

BACKGROUND

At a care facility, a need to weigh the patient often occurs. Patient handling apparatuses such as lifts, also referred to as patient hoists, are commonly used to raise, lower and transfer patients who are disabled or who otherwise have mobility problems. Two common types of patient lifts are stanchion-mounted lifts, also known as floor lifts, and ceiling lifts. Floor lifts often have a hoist assembly, which may be disposed at the upper end of a stanchion. The stanchion has a wheeled base, which allows the lift to be moved along the ground to different locations. In order to enable weighing of immobilized patents, patient handling apparatuses may be equipped with a scale. Thus, a patient may be weighed while being suspended from the patient handling apparatus.

Such patient handling apparatus often implements a sub frame arranged inside the main frame of the patient handling apparatus which carries the load of the patient. The patient is weighed by means of a load sensor mounted to the sub frame.

Patient handling apparatus implementing the aforementioned sub frame are associated with substantial drawbacks.

Firstly, it requires the center of gravity of the patient to be inside the area formed by the sub frame. Thus, the sub frame often has to be relatively large, which increases the overall size of the patient handling apparatus, which may be an issue in a care unit where space is often scarce.

Secondly, the process of balancing and calibrating the weighing system is cumbersome and time consuming.

In the light of the above, there is a need for a patient handling apparatus, which is associated with a more compact patient handling apparatus, which is easier to balance.

SUMMARY

According to one aspect, a patient handling apparatus is provided. The patient handling apparatus comprises a base with a frame and a patient support device.

The patient handling apparatus further comprises a weighing arrangement for weighing a patient supported by the patient support device. The weighing arrangement comprises a sub frame and a plurality of load sensors. The sub frame is arranged on the load sensors. The load sensors define a weighing area.

The patient support device is mounted to the frame such that a central point of a seat support portion of the patient support device is positioned outside the weighing area in at least one position of the patient support device.

According to an aspect, a patient handling apparatus is provided. The patient handling apparatus comprises a base with a frame and a patient support device.

The patient handling apparatus further comprises a weighing arrangement for weighing a patient supported by the patient support device. The weighing arrangement comprises a sub frame and a plurality of load sensors, said sub frame being arranged on the load sensors. The load sensors define a weighing area.

The patient support device is mounted to the frame at a mounting point such that said mounting point is positioned outside the weighing area in at least one position of the patient support device.

According to an aspect, a method for balancing a weighing arrangement of a patient handling is provided. The patient handling apparatus comprises a base with a frame and a patient support device. The weighing arrangement comprises a sub frame and a plurality of load sensors.

The method comprises obtaining sensor signals from said load sensors and adjusting adjustable fixating means to adjust the fixation of the load sensors based on said sensor signals.

Further objects and features of the present invention will appear from the following detailed description of embodiments of the invention.

BRIEF DESCRIPTION OF DRAWINGS

The invention will be described with reference to the accompanying drawings, in which.

DETAILED DESCRIPTION

Figure 1:
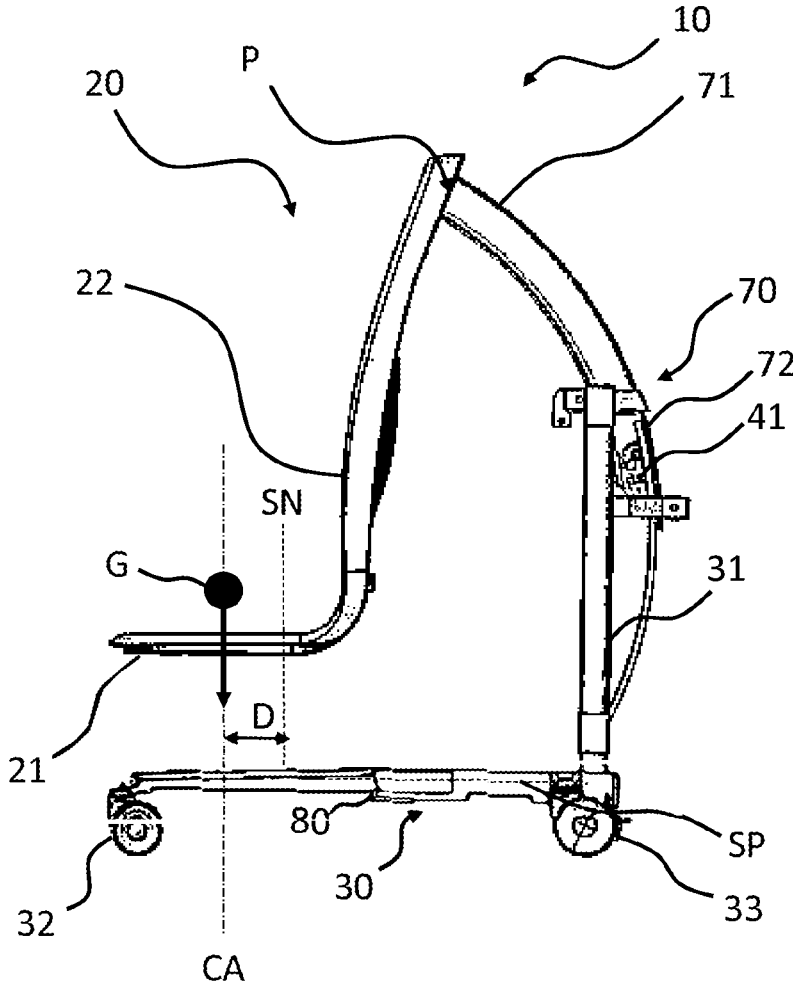
FIG. 1 is a side view of the patient handling apparatus according to an embodiment.

FIG. 1 shows a patient handling apparatus 10. The patient handling apparatus 10 comprises a base 30 with a frame 31. The base 30 may be movable relative the ground. The base 30 may be provided with wheels 32, 33 adapted to allow movement of the base, i.e. the patient handling apparatus 10, relative the ground. The patient handling apparatus 10 further comprises a patient support device 20.

The patient handling apparatus 10 comprises a patient support device 20. The patient support device 20 is adapted to support a patient, i.e. support the weight of said patient.

In one embodiment, the patient support device 20 is movable relative to the base 30. The patient support device 20 is thus movably mounted to the frame 31. The patient support device 20 may for example be movable between an upright position and an inclined position. In the inclined position, patient support device 20 is inclined backwards or forwards in the inclined position relative to the upright position by means of a guiding arrangement 70.

An upright position may herein be defined as a position wherein the patient supported by the patient support device 20 is in an upright position. Accordingly, the spline of the patient extends substantially in a vertical direction.

An inclined position may herein be defined as a position wherein the patient supported by the patient support device 20 is an inclined position, i.e. an inclined position relative the upright position. The inclined position is thus a position wherein the patient is tilted, i.e. the spline of the patient is tilted, relative a vertical axis of the patient handling apparatus.

In one embodiment, the patient support device 20 may be movable between a raised position and a lowered position. Thus, the patient support device 20 may be movable along a vertical direction.

In one embodiment, the patient support device 20 may comprise a seat support portion 21. The seat support portion 21 is adapted to support the rear of a patient supported by the patient support device 20.

In one embodiment, the patient support device 20 may further comprise a back support portion 22. The back support portion 22 is adapted to support the back of a patient when the patient is supported by the patient support device 20.

In one embodiment, the patient support device 20 may be in the form of a chair support. The patient support device 20 is thus adapted to support a seated patient. Accordingly, the back support portion 22 and the seat support portion 21 may be substantially orthogonal to each other. In one embodiment, the patient support device 20 may further comprise a calf supporting section pivotally mounted to the seat support portion 21. Said calf supporting section is adapted to support the calves of a patient supported by the patient support device 20.

Figure 2:
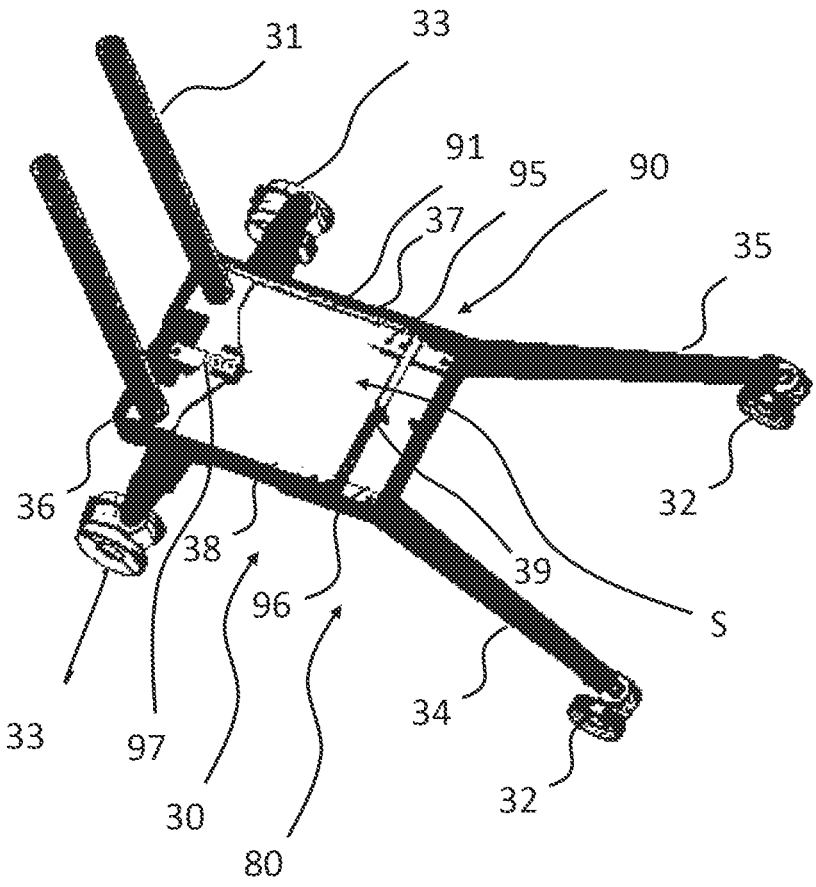
FIG. 2 is a perspective view of the base and the weighing arrangement of the patient handling apparatus according to an embodiment.
Figure 3:
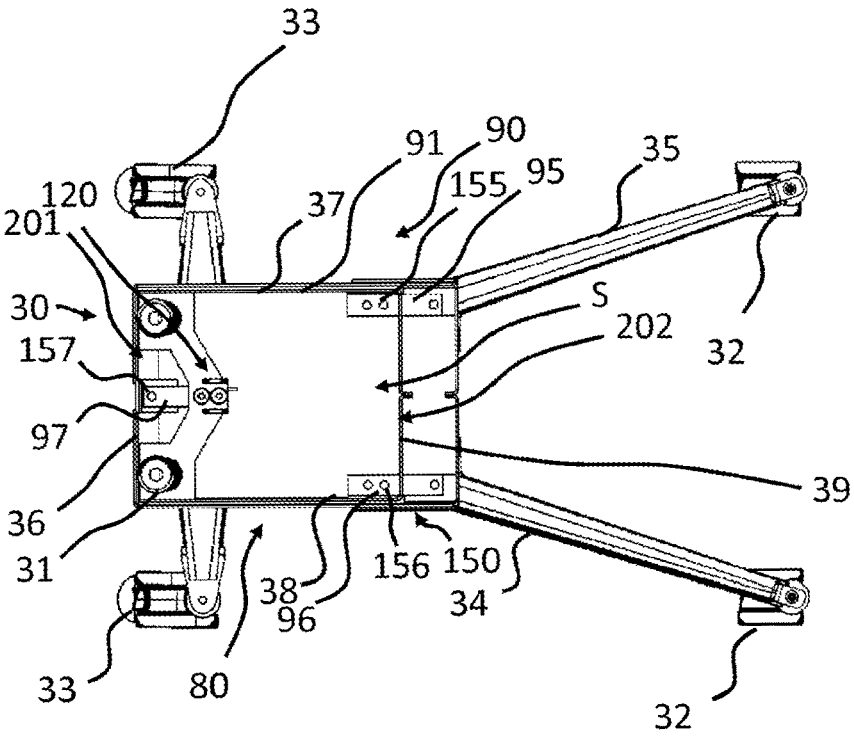
FIG. 3 is a top view of the base and the weighing arrangement of the patient handling apparatus according to an embodiment.

Turning to FIGS. 2 and 3, the patient handling apparatus comprises a weighing arrangement 90 for weighing a patient supported by the patient support device 20. Notably, supported herein may refer to any type of supporting of the patient. The type of support provided by the patient support device 20 may differ based on the patient's posture and position as well as the type of patient support device 20. For example, the patient may be supported by the patient support device 20 by being suspended from the patient support device 20 or the patient support device 20 constituting a seating surface for a patient in a seated position.

The weighing arrangement comprises a sub frame 91 and a plurality of load sensors 95, 96, 97. The sub frame 91 is arranged on the load sensors 95, 96, 97. The load sensors 95, 96, 97 defines a weighing area S.

Using multiple load sensors eliminates the need for "cornering" which is an expensive and complex process of machining single point load cells with a particular implementation in mind.

Preferably, the patient support device 20 is mounted to the frame 31 such that a center of gravity G of the patient, when the patient is supported by the patient support device 20, is positioned outside the weighing area S.

To achieve this, the patient support device 20 is mounted to the frame 31 such that a central point of the seat support portion 21 (depicted in FIG. 1) of the patient support device 20 is positioned outside the weighing area S in at least one position of the patient support device 20 (shown in FIG. 2).

This is associated with a number of advantages:

Firstly, the weighing arrangement is less sensitive to flexing or bending compared to a conventional weighing arrangement wherein the center of gravity of the patient is positioned inside the weighing area, particularly if the sub frame 91 is adapted to be more rigid than the frame 31 and/or other components of the patient handling apparatus which carries the load of the weight of the patient. This is due to frame taking the load from the patient and the offset patient not exerting any weight directly toward the sub frame. Thus, the weighing arrangement and sub frame may be considerably smaller while providing sufficient functionality, allowing for a more compact patient handling apparatus.

Secondly, the weighing arrangement according to the invention allows the patient to be weighed when the patient support device is at different vertical and tilted positions in relation to the load sensors while the sensors still provides a correct measurements and the calculated weight is accurate. In a conventional weighing arrangement wherein the center of gravity of the patient is positioned inside the weighing area, the uneven distribution of load between the load sensors would cause the calculated weight to be imprecise or incorrect.

Thirdly, the mounting of the sub frame on the load sensors prevents the patient handling apparatus to fall over or tip in case a load cell brakes, since a broken load cell only will cause the sub frame to drop in towards the frame, which does not affect the rest of the patient handling apparatus.

In one embodiment, the central point of the seat support portion 21 is positioned outside the weighing area S of the patient support device 20 in multiple positions of the patient support device 20. In one embodiment, the central point of the seat support portion 21 is positioned outside the weighing area S of the patient support device 20 in all positions of the patient support device 20. In one embodiment, the patient support device 20 is stationary, whereby the central point of the seat support portion 21 is stationary mounted outside the weighing area S.

Further referencing FIGS. 2 and 3, the base 30 comprises a horizontally extending portion 80. The frame 31 extends in a substantially vertical direction. The horizontally extending portion 80 may be arranged to be adjacent to the floor, the frame 31 extending upwards from said horizontally extending portion 80. Hence, the horizontally extending portion 80 may be provided with the wheels 32, 33. The base 30 may thus be a movable base 30, in an alternative embodiment the base 30 may be a stationary base.

Referencing FIG. 1 in combination FIGS. 2 and 3, the weighing area S extends parallel to the horizontally extending portion 80. Thus, the weighing area S may form a delimited plane SP, i.e. a plane delimited by the load sensors 95, 96 97, extending in a horizontal direction.

A central position axis CA extends through the central position of the seat support portion 21. The central position axis CA extends in a vertical direction. The central position axis CA may be parallel to a normal, i.e. normal vector, SN of the delimited plane SP. The central position axis CA may extend at an offset horizontal distance D from said normal SN. For reference, the normal SN may extend from an outer edge of the delimited plane SP proximal to the central position axis CA.

The gravitational force from the center of gravity of a patient supported by the patient support device 20 extends parallel to the central position axis CA. Preferably, the gravitational force extends in a direction aligned with the central position axis CA.

Referencing FIGS. 2 and 3, the load sensors may be arranged on the base 30 or the horizontally extending portion 80 of the base 30. Thus a first part of each load sensor 95, 96, 97 is arranged on the base 30, whereby the sub frame 91 is arranged on a second part of each load sensor 95, 96, 97. Said second part of each load sensor 95, 96, 97 is solely supported by the sub frame 91. Accordingly, the second part of each load sensors 95, 96, 97 does not rest on the base 30.

In one embodiment, a bottom side of the load sensors 95, 96, 97 is mounted to the base 30 or the horizontally extending portion 80 of the base 30. The sub frame 91 is arranged on a top side of the load sensors 95, 96, 97.

The horizontally extending portion 80 may comprise a support structure. In one embodiment the sub frame 91 may be arranged inside said support structure. The support structure may comprise a plurality of elongated support members forming a rectangular support structure.

The sub frame 91 is arranged on a first load sensor 97, a second load sensor 95 and a third load sensor 96. Thus an accurate weight may be calculated while keeping the number of sensors to a minimum and not having to resort to expensive single point load sensors.

The first load sensor 97 is arranged proximal to the frame 31, i.e. the position where the frame extends from the horizontally extending portion 80. Each of the second load sensor 95 and the third load sensor 96 is arranged distally from the frame 31 at a distance from the first load sensor 96 extending across the weighing area S. In one embodiment, said distance may extend along the horizontally extending portion 80.

Thus, the first load sensor 97 may be arranged at a first edge 201 of the weighing area S, i.e. the delimited plane SP. The second load sensor 95 and the third load sensor 96 may be arranged along a second edge 202 of the weighing area S, i.e. the delimited plane SP. The second edge 202 is opposite to the first edge 201.

The first edge 201 may be proximal to the frame 31, i.e. the position where the frame 31 extends from the horizontally extending portion 80. The second edge 202 may be distal to the frame 31, i.e. the position where the frame extends from the horizontally extending portion 80.

The sub frame 91 may comprise a first sub frame member 36 and a second sub frame member 39. The second sub frame member 39 is arranged at a distance extending across the weighing area S from the first sub frame member 36. Thus, the first sub frame member 36 may be arranged at the first edge 201 of the weighing area S and the second sub frame member 39 may be arranged at the second edge 202 of the weighing area S. In one embodiment, said distance may extend along the horizontally extending portion 80. In one embodiment, the second sub frame member 39 extends parallel to the first sub frame member 36.

The sub frame 91 may further comprise a third sub frame member 37 and a fourth sub frame member 38. The third sub frame member 37 is connected to the first sub frame member 36 and the second sub frame member 39. The fourth sub frame member 38 is connected to the first sub frame member 36 and the second sub frame member 39.

Thus, the third and fourth frame member 37, 38 may interconnect the first sub frame member 36 and the second sub frame member 39. The third sub frame member 37 may extend parallel to the fourth sub frame member 38.

The first sub frame member 36 may be arranged on the first load sensor 97. The second sub frame member 39 and/or the third sub frame member 37 may be arranged on the second load sensor 95. The second sub frame member 39 and/or the fourth sub frame member 38 is arranged on the third load sensor 96.

Further referencing FIGS. 2 and 3, the sub frame 91 may be connected to the base 30 by means of the load sensors 95, 96, 97. Thus, the sub frame 91 is only suspended to the base 30 by the load sensors 95, 96, 97. The load sensors 95, 96,

97 may be configured to measure the load, i.e. tension, between the base 30 and the sub frame 91.

A first portion, e.g. a first end of each load sensor 95, 96, 97 may be connected to the base 30. A second portion, e.g. a second of each load sensor 95, 96, 97 may be connected to the sub frame 91. Accordingly, the first end of each load sensor 95, 96, 97 may be fix to the base 30. The second end of each load sensor 95, 96, 97 may be fix to the sub frame 91.

The load sensors 95, 96, 97 may be load cells. As is well known in the field load cells are a type of transducers, which converts load into an electric signal readable by a processing unit such as a control unit. Load cells may be of hydraulic, pneumatic or strain gauge type. Preferably, the load cells may be strain gauge load cells due to their cost-efficiency. The load sensors 95, 96, 97 may be beam load cells such as double-ended shear beams.

The first load sensor 97 may be arranged proximal to the frame 31. The first load sensor 97 is arranged and balanced such that a downwards directed load applied to the central position C of the seat support portion 21 results in a tension load in said first load sensor 97. The tension load may extend along the first load sensor 97 in the delimited plane SP. The tension load may at least partially extend towards the central portion C of the seat support portion 21, i.e. at least one load component vector of said load extends towards the central portion P.

In one embodiment, a central portion of the first sub frame member 36 is arranged on said first load sensor 97.

In one embodiment, wherein the weighing arrangement comprises additional sensors, the first sub frame member 36 may be arranged on a plurality of load sensors, each being arranged and balanced such that a downwards directed load applied to the central position C of the seat support portion 21 results in a tension load in the load sensors. The tension load extend along each of the load sensors in the delimited plane SP.

In one embodiment, the first load sensor 97 may connect to the base 30, i.e. the horizontally extending portion 30 at a position between the first sub frame member 36 and the second and third load sensor 95, 96.

The second load sensor 95 may be arranged distally from the frame 31. Preferably, the second load sensor 95 is arranged adjacent to the connection between the third sub frame member 37 and the second sub frame member 39.

The second load sensor 95 is arranged and balanced such that the measurable tension in the first load sensor causes a resulting measurable load in said second load sensor 95 via the sub frame 91. The resulting tension load extend along the second load sensor 95 in the delimited plane SP.

The third load sensor 96 may be arranged distally from the frame 31. Preferably, the third load sensor 96 is arranged adjacent to the connection between the fourth sub frame member 38 and the second sub frame member 39.

The third load sensor 96 is arranged and balanced such that the measurable tension in the first load sensor causes a resulting measurable load in said third load sensor 96 via the sub frame 91. The resulting tension load extend along the third load sensor 96 in the delimited plane SP.

In one embodiment, only the second sub frame member 39 is arranged on the second load sensor 95 and the third load sensor 96. In one embodiment, the second load sensor 95 and third load sensor 96 solely connects the second sub frame member 39 with the base.

In one embodiment, the third sub frame member 37 and second sub frame member 39 are arranged on the second load sensor 95 and the fourth sub frame member 38 and second sub frame member 39 are arranged on the third load sensor 96. Thus, the second load sensor 95 connects the third frame member 37 and the second sub frame member 39 to the base. Similarly, the third load sensor 96 connects the fourth sub frame member 38 and the second sub frame member 39 to the base.

As depicted in FIG. 3, the patient handling apparatus may further comprise adjustable fixating means 150. The adjustable fixating means 150 may be adapted to adjustably fixate the load sensors 95, 96, 97 to the sub frame 91 and/or to the base 30. Thus, the tension in the load sensors 95, 96, 97 may be set by means of said adjustable fixating means 150 in a simple and user-friendly manner making the balancing of the weighing arrangement more efficient. This is particularly advantageous if the load sensors are load cells and more preferably beam load cells.

Balancing herein refers to the process of setting up a pre-set tension, i.e. load, in each load sensor and thus distributing the tension between the sub frame 91 and the base 30 via said load sensors to a pre-set reference value, i.e. load value.

Accordingly, the adjustable fixating means 150 is adapted to control a fixating force holding the load sensor to the base 30 and/or sub frame 91. Thereby, balancing of the weighing arrangement may be achieved by adjusting the adjustable fixating means and consequently the fixating force.

In one embodiment, one of the portions of each load sensor is a fix end, i.e. fixedly mounted to the base 30 or the sub frame 91 and the other portion of each load sensor is connected of the other of the base 30 and the sub frame 91 by means of the adjustable fixating means.

The adjustable fixating means 150 may comprise adjustable fixating members 155, 156, 157. The adjustable fixating members 155, 156, 157 are adapted to adjustably fixate each of the load sensors 95, 96, 97 to the sub frame 91 and/or the base 30. The load sensors 95, 96, 97 may be mounted to the sub frame 91 and/or the base 30 by means of said adjustable fixating members 155, 156, 157, whereby adjustment of said adjustable fixating members 155, 156, 157 causes adjustment of the fixating force holding each of the load sensors 95, 96, 97 to the base 30 and/or sub frame 91.

In one embodiment, the adjustable fixating members 155, 156, 157 are adjustable fastening elements, such as bolts or screws or similar, connecting each of the load sensors 95, 96, 97 to the base and/or sub frame 91. By providing torque to the adjustable fastening elements, the fixating force on the load sensor increases or decreases.

Figure 4:
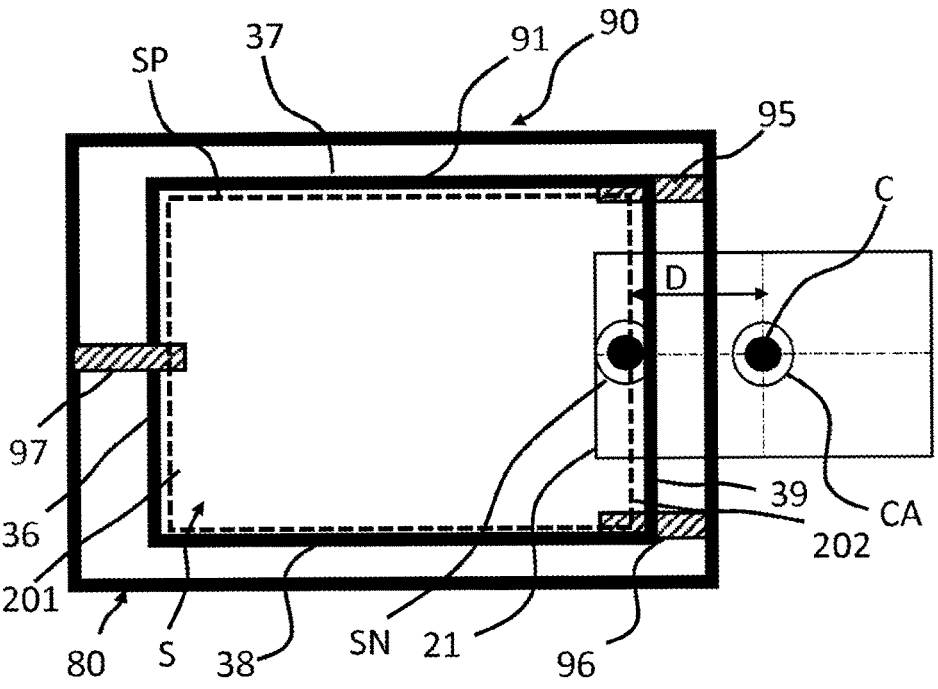
FIG. 4 is a schematic top view of the weighing arrangement and the sub frame of the patient handling apparatus according to an embodiment.

Turning to FIG. 4, a patient handling apparatus 10 according to an embodiment is depicted. As previously described, the central position C of the seat support portion 21 of the patient support device 20 is positioned outside the weighing area S in at least one position of the patient support device. The seat support portion 21 may be considered a portion of the patient support device adapted to support the rear of a patient supported the patient support device 20. The central point is consequently a centrally disposed point of said portion. The central point C is thus positioned at an offset horizontal distance relative the weighing area S in at least one position of the patient support device 20. The offset horizontal distance may be defined as the offset horizontal distance D between the normal SN and the central position axis CA as previously described with reference to FIG. 1. The normal SN may thus extend from a position along the second edge 202 of the weighing area S, i.e. a second edge of the delimited plane SP.

Notably, the central point C of the seat support portion 21 is relatively aligned with the center of gravity G (as depicted in FIG. 1) of a patient seated on said seat support portion 21, whereby it is ensured that the center of gravity G of the patient is outside the weighing area S as long as the central point C of the seat support portion 21 is outside said weighing area S.

The seat support portion 21 may be a separate element of the patient support device 20 or an integrated portion of a larger support part of the patient support device 20 which supports the rear of the patient supported by said patient support device 20.

The weighing area S forms the delimited plane SP defined by the load sensors 95, 96, 97, i.e. the connections between said load sensors 95, 96, 97 and the sub frame 91. The weighing area S may be aligned with the sub frame 91. As previously described, the sub frame 91 may form a rectangular shape. Thus, the weighing area S may form a rectangular delimited plane SP aligned with said sub frame 91. The weighing area S may be parallel to said sub frame 91.

Figure 5:
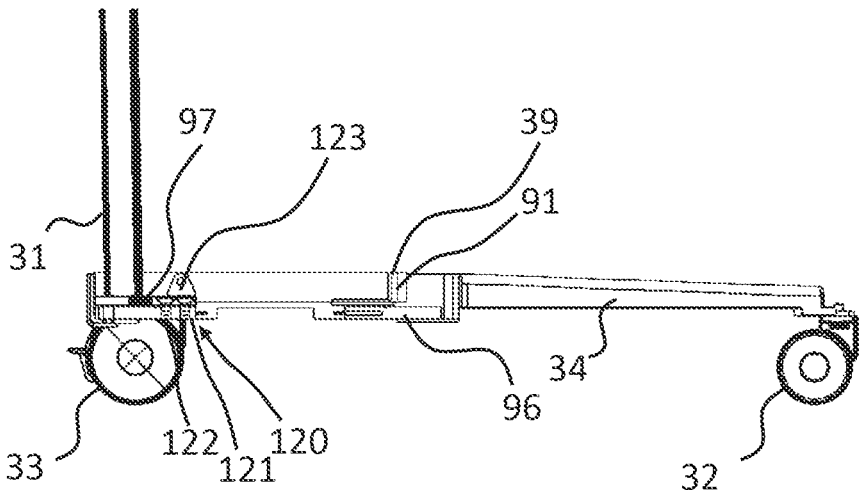
FIG. 5 is a cross-section view of the weighing arrangement and base of the patient handling apparatus according to an embodiment.

FIG. 5 depicts a partial cross-section of the patient handling apparatus.

The patient handling apparatus may comprise a securing arrangement 120. The securing arrangement 120 may be adapted to upon actuation lock the position of the sub frame 91 relative the base 30. The securing arrangement 150 allows for keeping the sub frame 91 in a set position relative the base 30 once the calibration and balancing has been performed. Thus, the risk for the user having to re-calibrate and re-balance the weighing arrangement due to the sub frame 91 and base 30 moving relative each other by accident, impact or wear of the load sensors is reduced.

In one embodiment, the securing arrangement 120 may comprise a securing member 123 movably mounted to the base 30 and/or sub frame 91 for engaging the other of the base 30 or sub frame 91 and thereby fixate the base 30 to the sub frame 91. The securing arrangement 120 may comprise at least one actuating member 121, 122 adapted to move said securing member 123 between an actuated position and a non-actuated position. In the actuated position, the securing member 123 fixates the sub frame 91 to the base 30. In the non-actuated position, the securing member 123 does not provide said fixation between the sub frame 91 and the base 30.

The at least one actuating member 121, 122 may be at least one actuation screw. Said actuation screw may extend in a vertical direction through and aperture of the securing member 123, whereby rotation of said screw in a first direction moves the engagement member 123 towards the actuated position and in a second direction moves the engagement member 123 away from said actuated position.

In alternative embodiment, the securing member 123 may be a spring-loaded clamp. The spring-loaded clamp may be arranged to selectively lock, i.e. secure, the position of the sub frame 91 relative the base 30.

Further referencing FIG. 5, the securing member is adapted to engage the first sub frame member 36, i.e. the sub frame member most adjacent to the frame 31.

Figure 6:
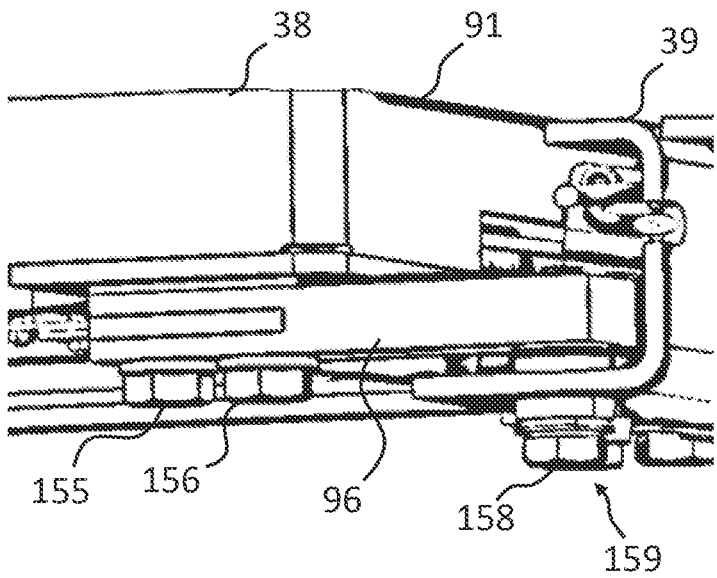
FIG. 6 is a schematic view of a sub frame and load sensor according to an embodiment.
Figure 7:
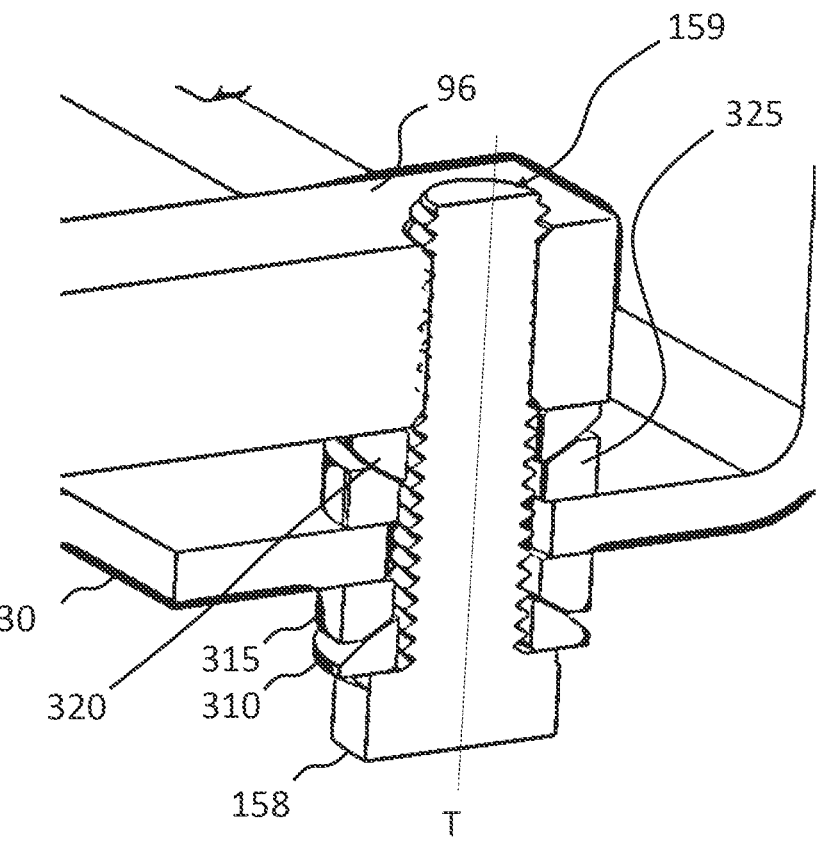
FIG. 7 is a schematic cross-section view of a sub frame and load sensor according to an embodiment.
Figure 8:
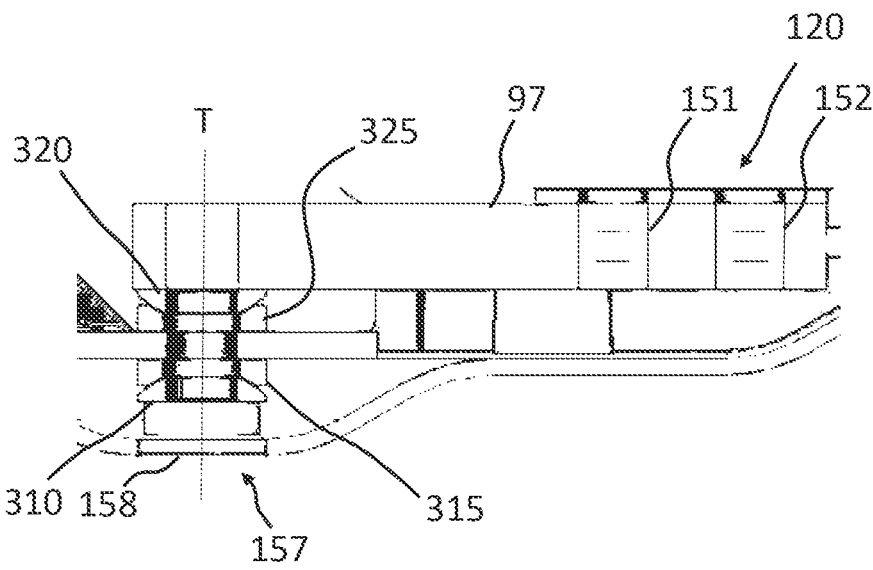
FIG. 8 is a schematic cross-section view of a sub frame and load sensor according to an embodiment.

An issue arising with the mounting of loads sensors, is that tensioning strain will occur between the base 30 and the sub frame 91 due to the connection between the load sensor and the base. Turning to FIGS. 6 to 8, to address this, the patient handling apparatus may comprise a load sensor fastening arrangement for setting the correct tension of the connection between the load sensor and the base. Thus, according to an aspect of the invention a load sensor fastening arrangement is provided.

Accordingly, at least one of the load sensors 95, 96, 97 is mounted to the base 30 by means of a load sensor fastening arrangement. Preferably, each of the load sensors 95, 96, 97 is mounted to the base 30 by means of a load sensor fastening arrangement.

The load sensor fastening arrangement comprises a fastening element 159. The fastening element 159 is adjustable along a tensioning axis T for setting the tension between the load sensor 95, 96, 97 and the base 30. As depicted in FIG. 6-8, the fastening element 159 may extend along the tensioning axis T The load sensor fastening arrangement further comprises supporting means 310, 315, 320, 325. The supporting means comprises a support element 310, 320, i.e. at least one support element 310, 320 and a support member 315, 325, i.e. at least one support member 315, 325. The support element 310, 320 or the support member 315, 325 has a bowl shaped surface. The other of the support element 310, 320 or the support member 315, 325 has a dome shaped surface. The dome shaped surface may have a shape corresponding to the bowl shaped surface.

The bowl shaped surface and dome shaped surface may be spherical. The bowl shaped surface and dome shaped surface may face directions extending along the tensioning axis T. Preferably, the tensioning axis T may extend vertically. The dome shaped surface and bowl shaped surface may face each other. The dome shaped surface and bowl shaped surface may face each other relative the tensioning axis T.

Thus, the curvature of the bowl shaped surface and the curvature of the dome shaped surface engage such that a convex surface of the support member or support element engages with a corresponding concave surface of the other of the support member or support element.

Advantageously, the support member and support element may each comprise a substantially planar surface extending orthogonally to the tensioning axis T. The substantially planar surface may thus be arranged opposite to the bowl shaped surface or dome shaped surface of the support member or support element.

The curvature of the bowl shaped surface is arranged to engage the curvature of the dome shaped surface when the fastening element 159 is adjusted for increasing the tension between the load sensor 95, 96, 97 and the base 30. Thus, the curvature of the bowl shaped surface or dome shaped surface of the support element 310, 320 is arranged to be brought into contact with the curvature of the other of the bowl shaped surface and the dome shaped surface of the support member 315, 325 when the fastening element 159 is adjusted for increasing the tension between the load sensor 95, 96, 97 and the base 30. Accordingly, the support member and support element are arranged to engage upon adjustment of the fastening element 159 for increasing the tension between the load sensor 95, 96, 97 and the base 30.

The bowl and dome shaped surface creates a pivot point for the mounting of the load sensor which reduces the strain between the sub frame and the base. Further, the surfaces provides an indication of the correct tensioning and positioning of the load sensor. This makes it easier for an operator to match the individual positioning of the load sensors and consequently allows for easier calibration of the weighing arrangement.

Referencing FIG. 6-8, a geometrical center point of the curvature of the bowl shaped surface of the support element 310, 320 or the support member 315, 325 may be arranged along an axis extending parallel to or in alignment with the tensioning axis T. Correspondingly, a geometrical center point of the curvature of the dome shaped surface of the other of the support element 310, 320 and the support member 315, 325 may also be arranged along said axis extending parallel to or in alignment with the tensioning axis T.

The curvature of the dome and bowl shaped surface may be arranged orthogonally to said axis extending parallel to or in alignment with the tensioning axis T. Thus at a point of intersection between said axis and the dome or bowl shaped surface, said dome or bowl shaped surface may be orthogonal to said axis. The support element and support member may be arranged orthogonally to said axis extending parallel to or in alignment with the tensioning axis T.

The dome shaped surface and the bowl shaped surface may be arranged to form a spherical joint upon engagement. Thus, adjustment of the fastening element 159 for increasing the tension between the load sensor 95, 96, 97 and the base 30 along the tensioning axis T causes fixation of said spherical joint.

As depicted in FIG. 6-8, the dome shaped surface of the support element 310, 320 is arranged to engage the bowl shaped surface of the support member 315, 325 when the fastening element 159 is adjusted for increasing the tension between the load sensor 95, 96, 97 and the base 30.

Preferably, the load sensor 95, 96, 97 is mounted to the base 30 by means of the load sensor fastening arrangement and a fixed connection to the sub frame. In one embodiment, a first end of the load sensor 95, 96, 97 is connected to the base 30 by means of the load sensor fastening arrangement and a second end is connected to the sub frame by means of the fix connection.

In one embodiment, the support element 310, 320 is provided with a through-hole. The support member 315, 325 is also provided with a through-hole. The fastening element 159 may extend through said through-holes. The supporting means may be arranged along the tensioning axis T.

In alternative embodiment, the support member and support element may be arranged as protruding elements provided on the load sensor 95, 96, 97 and the base 30. The support member and support element may be arranged offset from the fastening element 159. Compared to such an arrangement, having the fastening element extending through the holes allows for a less complex and more user-friendly mounting of the load sensors.

Further referencing FIGS. 6 to 8, the fastening element 159 may extend in a hole provided in the base 30 and in a hole provided in the load sensor 95, 96, 97. The load sensor 95, 96, 97 may be provided with a through-hole, whereby the fastening element 159 may extend through said load sensor 95, 96, 97.

In one embodiment, the fastening element 159 may comprise a fixating portion 158. The supporting means comprises a first support element 310 and a first support member 315 arranged between the fixating portion 158 and the load sensor 95, 96, 97 or the base 30. In the depicted embodiment, the first support element 310 and the first support member 315 are arranged between the base 30 and the fixating portion 158. The supporting means may further comprise a second support element 320 and second support member 325 arranged between the load sensor 95, 96, 97 and the base 30. The first and second support element are arranged to engage the first and second support member, respectively. Having support means in the form of a first and second support element and member allows for easier rotation of the fixating element around its center and further accommodates pivoting of the fastening element.

The planar surfaces of the support element 310, 320 and the support member 315, 325 may abut to corresponding planar surfaces of the load sensor, base or fastening element when the load sensor is in a mounted position.

As most clearly depicted in FIG. 7, the fastening element may be provided with threads for engaging corresponding threads in the base 30. Again referencing FIG. 7, the fixating element may be a screw. The fixating portion may thus be a head of the screw. The support element(s) and support member(s) 310, 315, 320, 325 may be washers. The washers may be arranged coaxially with the fastening element.

Figure 9:
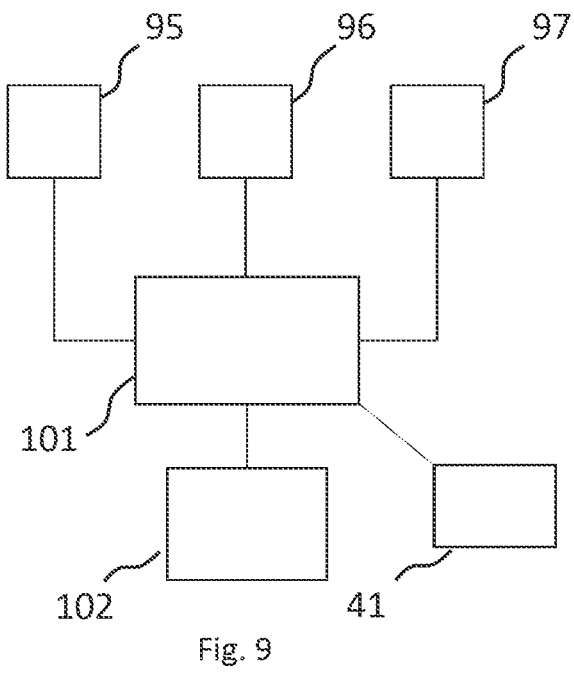
FIG. 9 is a schematic drawing of the control system of the patient handling apparatus according to an embodiment.

FIG. 9 depicts a schematic drawing of the control unit and associated components of the patient handling apparatus according to an embodiment, The patient handling apparatus comprises a control unit 101 operatively connected to the load sensors 95, 96, 97. The control unit 101 is configured to calculate the weight of a patient supported by the patient support device 20 based on sensor signals from the load sensors 95, 96, 97. Thus, the weight of the patient may be accurately calculated even though relatively simple and cost efficient load sensors are used, since only the tension between the base and the sub frame is required to be measured for an accurate calculated weight.

The sensor signals from the load sensors 95, 96, 97 are indicative of the load applied to each of said load sensors 95, 96, 97. Further, the sensor signals from the load sensors 95, 96, 97 are indicative of the tension between the sub frame 91 and the base 30 through each of the load sensors 95, 96, 97.

Accordingly, the control unit 101 may be configured to compare load data obtained from the sensor signals from the load sensors 95, 96, 97 when a patient is mounted to the patient support device with 20 reference load data obtained from the sensor signals from said load sensors 95, 96, 97 from when no patient is mounted to the patient support device 20 and thereby obtain the weight of said patient supported by the patient support device 20. The reference load data may be obtained when the weighing arrangement has been calibrated and balanced. The reference load data may also be used during re-calibrating and re-balancing of said weighing arrangement.

The control unit is configured to calculate the weight of the patient supported by the patient support device by calculating a weight value indicating the weight of said patient supported by the patient support device based on the sensor signals from the load sensors 95, 96, 97. The control unit may comprise a processor for calculating said weight.

In one embodiment, the control unit 101 may be configured to convert the sensor signals from the load sensors 95, 96, 97 to load data. In one embodiment, this may be performed by a converter operatively connected to the load sensors and control unit.

The patient handling apparatus may further comprise an indicating device 102 configured to display the weight calculated by the control unit 101. The indicating device 102 may be in the form of a display with a graphical user interface (GUI). The indicating device 102 is operatively connected to the control unit 101 for presenting the weight. In one embodiment, the indicating device 102 may comprise a device configured to generate an audible or visible alarm or alert when the calculated weight of the patent exerts a threshold weight.

In one embodiment, the indicating device 102 is configured to display the load data obtained from the sensor signals, from the load sensors 95, 96, 97. The load data may represent the load, i.e. tension, on each of the load sensors 95, 96, 97. This is particularly advantageous during balancing and calibration of the weighing arrangement since it allows for tracking of the load exerted on each load sensor 95, 96, 97 during said balancing and calibration. This is particularly advantageous in combination with the adjustable fixating means described with reference to FIG. 3 since it allows for a user to control said adjustable fixating means while using the indicating device as reference during balancing of the weighing arrangement. The load data may be in the form of force tensors on each of the load sensors 95, 96, 97.

In one embodiment, the indicating device 102 is configured to only display the aforementioned calculated weight. In one embodiment, the indicating device 102 is configured to display the weight and load data. In one embodiment, the indicating device 102 is configured to display only the load data.

In one embodiment, the indicating device 102 is further configured to display the reference load data. The reference load data may be displayed together with the load data further helping the user to achieve a correct balancing of the weighing arrangement.

Further referencing FIG. 9, the control unit 101 may be configured to obtain load data from said sensor signals from the load sensors 95, 96, 97. Further, the control unit 101 may be configured to calculate the weight value indicating the weight of the patient supported by the patient support device based on said load data.

The control unit 101 may be mounted to the base 30 of the patient handling apparatus or may for a separate device.

In one embodiment, the control unit 101 may comprise a communication interface, whereby the control unit 101 is further configured to transfer the aforementioned calculated weight value to an external device, such as a smart phone or computer. This may be an alternative to the indicating device 102 or be utilised together with said indicating device 102.

According to an aspect, a patient handling apparatus 10 is provided. As previously described with reference to FIG. 1, the patient handling apparatus 10 comprises the base 30 with the frame 31. The patient handling apparatus further comprises the patient support device 20. The patient handling apparatus further comprises the weighing arrangement 90 for weighing a patient supported by the patient support device 20. The weighing arrangement comprises the sub frame 91 and the plurality of load sensors 95, 96, 97, said sub frame 91 being arranged on the load sensors 95, 96, 97. The load sensors 95, 96, 97 defines the weighing area S.

Again referencing FIG. 1, the patient support device 20 is mounted to the frame 31 at a mounting point P such that said mounting point P is positioned outside the weighing area S (as depicted in FIG. 2-4) in at least one position of the patient support device 20. Thus the same advantages may be achieved even with a flexible and hanging type of patient support device, since it allows for positioning of the center of gravity G of the patient outside the weighing area S (due to the mounting point P being relatively aligned said center of gravity of the patient).

In one embodiment, the patient support device 20 is a patient sling. In one embodiment, the mounting point P may comprise a spreader bar or hanger for mounting of said sling.

The aforementioned patient handling apparatus may comprise any of the features previously described with reference to FIGS. 1 to 8.

According to an aspect a patient handling apparatus comprises the load sensor fastening arrangement described with reference to FIGS. 6 to 8. Thus, a patient handling apparatus 10 is provided. The patient handling apparatus comprises a base 30 with a frame 31 and a patient support device 20 mounted to the frame 31.

The patient handling apparatus 10 further comprises a weighing arrangement for weighing a patient supported by the patient support device 20. The weighing arrangement 90 comprises a sub frame 91 and a plurality of load sensors 95, 96, 97. The sub frame 91 is connected to the base 30 by the load sensors 95, 96, 97. In one embodiment, the sub frame 91 is arranged on the load sensors 95, 96, 97.

At least one of the load sensors 95, 96, 97 is mounted to the base 30 by means of a load sensor fastening arrangement. The load sensor fastening arrangement comprises a fastening element 159. The fastening element 159 is adjustable along a tensioning axis T for setting the tension between the load sensor 95, 96, 97 and the base 30. The load sensor fastening arrangement further comprises supporting means 310, 315, 320, 325. The supporting means 310, 315, 320, 325 comprises a support element 310, 320 and a support member 315, 325.

The support element 310, 320 or the support member 315, 325 has a bowl shaped surface. The other of the support element 310, 320 and the support member 315, 325 has a dome shaped surface.

The curvature of the bowl shaped surface is arranged to engage the curvature of the dome shaped surface when the fastening element 159 is adjusted for increasing the tension between the load sensor 95, 96, 97 and the base 30. The load sensor fastening arrangement may comprise any of the features described with reference to FIG. 6-8.

According to an aspect, a method 200 for balancing the weighing arrangement 90 of the patient handling apparatus 10 according to any of the previously described embodiments is provided. Thus, the patient handling apparatus 10 comprises the base 30 with the frame 20 and the patient support device 20. The weighing arrangement comprises the sub frame 91 and the plurality of load sensors 95, 96, 97.

Figure 10:
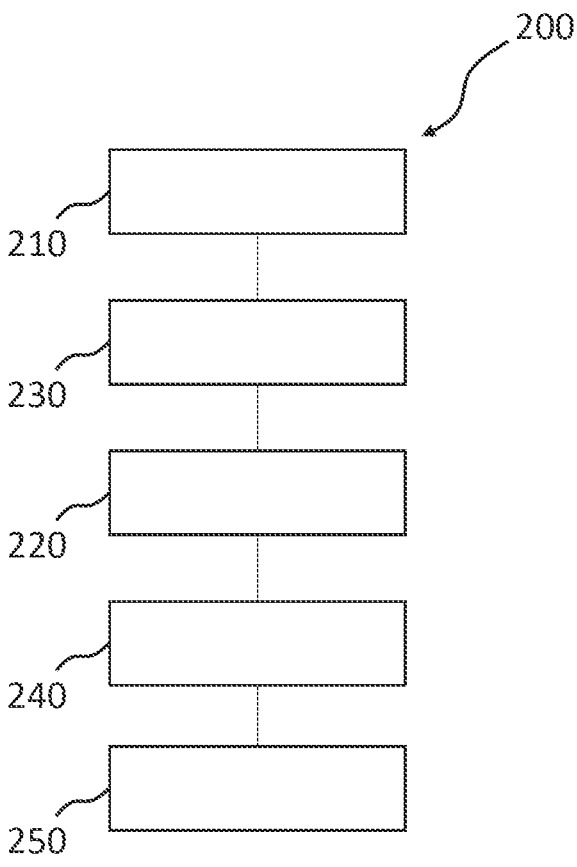
FIG. 10 is a schematic flow chart depicting a method for balancing a weighing arrangement according to an embodiment.

Referencing FIG. 10, the method comprises obtaining 210 sensor signals from the load sensors 95, 96, 97. The method further comprises adjusting 220 adjustable fixating means 150 to adjust the fixation of the load sensors 95, 96, 97 based on the sensor signals.

Thus, a method for balancing the weighing arrangement in a simple and precise manner may be achieved, since the user is able to balance the weighing arrangement directly based on the actual sensor signals from the load sensors.

The adjustable fixating means 150 for adjusting the fixation of the load sensors 95, 96, 97 may be the adjustable fixating means 150 described with reference to FIG. 5.

In one embodiment, the method further comprises presenting 230 load data obtained from the sensor signals from the load sensors 95, 96, 97 on an indicating device 102 of the patient handling apparatus 10. The indicating device 102 may be the indicating device 102 described with reference to FIG. 6.

Thus, the weighing arrangement may be adjusted 220 based on the presented load data from the load sensors 95, 96, 97 on the indicating device 102 of the patient handling apparatus 10.

The presenting 230 of the sensor signals from the load sensors 95, 96, 97 may further comprise individually presenting the load data obtained from the sensor signals from each load sensor 95, 96, 97 on the indicating device 102 of the patient handling apparatus 10.

In one embodiment, the method may further comprise actuating 240 a securing arrangement 120 to lock the position of the sub frame 91 relative the base 30. The method may comprise actuating 240 said securing arrangement after the adjusting 220 of the adjustable fixating means 150 to adjust the fixation of the load sensors 95, 96, 97 based on the sensor signals from the load sensor 95, 96, 97.

The securing arrangement 120 may be the securing arrangement as described with reference to FIG. 5.

In one embodiment, the method may further comprise calibrating 250 the patient handling apparatus by means of suspending a reference weight to the patient support device 20. Thus, the weighing arrangement is tested in terms of giving a correct estimation and calculation of the weight. The step of calibrating 250 may be performed after the adjusting 220 of the adjustable fixating means 150.

The invention has been described above in detail with reference to embodiments thereof. However, as is readily understood by those skilled in the art, other embodiments are equally possible within the scope of the present invention, as defined by the appended claims.

The invention claimed is:

1. A patient handling apparatus comprising a base with a frame and a patient support device,
    wherein the patient handling apparatus further comprises a weighing arrangement for weighing a patient supported by the patient support device, said weighing arrangement comprising a sub frame and a plurality of load sensors, said sub frame being arranged on the plurality of load sensors, the plurality of load sensors defining a weighing area,
    whereby the patient support device is mounted to the frame such that a central point of a seat support portion of the patient support device is positioned outside the weighing area in at least one position of the patient support device,
    wherein the sub frame is connected to the base by means of the plurality of load sensors,
    wherein the plurality of load sensors include a first load sensor, a second load sensor, and a third load sensor,
    wherein the sub frame is arranged on the first load sensor, the second load sensor and the third load sensor, and
    wherein the first load sensor is arranged proximal to the frame and each of the second load sensor and the third load sensor is arranged distally to said frame at a distance from the first load sensor extending across the weighing area.

2. The patient handling apparatus according to claim 1, further comprising a control unit operatively connected to the plurality of load sensors, said control unit being configured to calculate the weight of a patient supported by the patient support device based on sensor signals from the plurality of load sensors.

3. The patient handling apparatus according to claim 2, further comprising an indicating device configured to display the weight calculated by the control unit.

4. The patient handling apparatus according to claim 3, wherein the indicating device is configured to display load data obtained from the sensor signals from the plurality of load sensors.

5. The patient handling apparatus according to claim 4, wherein the plurality of load sensors are beam load cells.

6. The patient handling apparatus according to claim 5, wherein a first end of each load sensor of the plurality of load sensors is connected to the base and a second end of said each load sensor is connected to the sub frame.

7. The patient handling apparatus according to claim 1, wherein the plurality of load sensors are load cells.

8. The patient handling apparatus according to claim 1, further comprising adjustable fixating means adapted to adjustably fixate the plurality of load sensors to the sub frame and/or to the base.

9. The patient handling apparatus according to claim 8, wherein tension in the plurality of load sensors is set by means of the adjustable fixating means.

10. The patient handling apparatus according to claim 1, further comprising a securing arrangement adapted to upon actuation lock the position of the sub frame relative to the base.

11. The patient handling apparatus according to claim 1, wherein the base is movable relative to the ground.

12. The patient handling apparatus according to claim 1, wherein the base comprises a horizontally extending portion and the frame extends in a substantially vertical direction.

13. The patient handling apparatus according to claim 12, wherein the weighing area extends parallel to the horizontally extending portion.

14. The patient handling apparatus according to claim 1, wherein the first load sensor is arranged at a first edge of the weighing area and the second load sensor and the third load sensor are arranged along a second edge of the weighing area, said second edge being opposite to the first edge.

15. The patient handling apparatus according to claim 1, wherein the sub frame comprises a first sub frame member and a second sub frame member, the second sub frame member being arranged at a distance extending across the weighing area from the first sub frame member.

16. The patient handling apparatus according to claim 15, wherein the sub frame comprises a third sub frame member and a fourth sub frame member each connected to the first sub frame member and the second sub frame member.

17. The patient handling apparatus according to claim 15, wherein the first sub frame member is arranged on a first load sensor of the plurality of load sensors, the second sub frame member and/or the third sub frame member is arranged on a second load sensor of the plurality of load sensors and the second sub frame member and/or the fourth sub frame member is arranged on a third load sensor of the plurality of load sensors.

18. The patient handling apparatus according to claim 1, wherein the patient support device is a patient sling.

19. A method for balancing a weighing arrangement of the patient handling apparatus according to claim 1, the method comprising:

obtaining sensor signals from the plurality of load sensors, and adjusting adjustable fixating means to adjust a fixation of the plurality of load sensors based on said sensor signals.

20. The method according to claim 19, further comprising presenting load data obtained from the sensor signals from the plurality of load sensors on an indicating device of the patient handling apparatus.

21. The method according to claim 20, wherein presenting the sensor signals from the plurality of load sensors further comprises individually presenting load data obtained from the sensor signals from each of the plurality of load sensor on the indicating device.

22. The method according to claim 19, further comprising actuating a securing arrangement to lock a position of the sub frame relative to the base.

23. The method according to claim 19, further comprising calibrating the patient handling apparatus by means of suspending a reference weight to the patient support device.

24. A patient handling apparatus comprising a base with a frame and a patient support device, wherein the patient handling apparatus further comprises a weighing arrangement for weighing a patient supported by the patient support device, said weighing arrangement comprising a sub frame and a plurality of load sensors, said sub frame being arranged on the plurality of load sensors, the plurality of load sensors defining a weighing area, whereby the patient support device is mounted to the frame such that a central point of a seat support portion of the patient support device is positioned outside the weighing area in at least one position of the patient support device, wherein the sub frame is connected to the base by means of the plurality of load sensors, and wherein at least one load sensor of the plurality of load sensors is mounted to the base by means of a load sensor fastening arrangement, the load sensor fastening arrangement comprising a fastening element adjustable along a tensioning axis for setting a tension between the at least one load sensor and the base, the load sensor fastening arrangement further comprising supporting means, the supporting means comprising a support element and a support member, wherein the support element or the support member has a bowl shaped surface and the other of the support element and the support member has a dome shaped surface, wherein a curvature of the bowl shaped surface is arranged to engage a curvature of the dome shaped surface when the fastening element is adjusted for increasing the tension between the at least one load sensor and the base.

25. The patient handling apparatus according to claim 24, wherein the sub frame is arranged on a first load sensor of the plurality of load sensors, a second load sensor of the plurality of load sensors and a third load sensor of the plurality of load sensors, and wherein the first load sensor is arranged at a first edge of the weighing area and the second load sensor and the third load sensor are arranged along a second edge of the weighing area, said second edge being opposite to the first edge.

26. The patient handling apparatus according to claim 2, wherein the support element and the support member each is provided with through-holes, the fastening element extending through said through-holes.

27. The patient handling apparatus according to claim 24, wherein the fastening element extends in a hole provided in the base and the at least one load sensor and wherein the supporting means are arranged along the tensioning axis.

28. The patient handling apparatus according to claim 24, wherein the fastening element comprises a fixating portion and the supporting means comprises a first support element and a first support member arranged between the fixating portion and the at least one load sensor or base and a second support element and second support member arranged between the at least one load sensor and the base, the first and second support element being arranged to engage the first and second support member, respectively.

29. The patient handling apparatus according to claim 24, wherein the fastening element is provided with threads for engaging corresponding threads in the base and the support element and the support member are washers arranged coaxially with the fastening element.

30. The patient handling apparatus according to claim 24, wherein a geometrical center point of the curvature of the bowl shaped or dome shaped surface of the support element and the support member each is arranged along an axis extending parallel to or in alignment with the tensioning axis.

31. The patient handling apparatus according to claim 24, wherein the dome shaped surface and the bowl shaped surface are arranged to form a spherical joint upon engagement, whereby adjustment of the fastening element for increasing the tension between the at least one load sensor and the base along the tensioning axis causes fixation of said spherical joint.

32. The patient handling apparatus according to claim 24, wherein the patient support device is a patient sling.

33. A method for balancing a weighing arrangement of the patient handling apparatus according to claim 24, the method comprising:

obtaining sensor signals from the plurality of load sensors, and adjusting adjustable fixating means to adjust a fixation of the plurality of load sensors based on said sensor signals.

34. The method according to claim 33, further comprising presenting load data obtained from the sensor signals from the plurality of load sensors on an indicating device of the patient handling apparatus.

35. The method according to claim 34, wherein presenting the sensor signals from the plurality of load sensors further comprises individually presenting load data obtained from the sensor signals from each of the plurality of load sensor on the indicating device.

36. The method according to claim 33, further comprising actuating a securing arrangement to lock a position of the sub frame relative to the base.

37. The method according to claim 33, further comprising calibrating the patient handling apparatus by means of suspending a reference weight to the patient support device.

* * * * *